United States Patent [19]

Jenkinson

[11] 3,830,409
[45] Aug. 20, 1974

[54] CONTROLLING THE SUPPLY OF ARTICLES

[75] Inventor: Bruce Ian Jenkinson, Turramurra, New South Wales, Australia

[73] Assignee: S. I. Handling Systems, Incorporated, Easton, Pa.

[22] Filed: Nov. 28, 1972

[21] Appl. No.: 309,991

[30] Foreign Application Priority Data
Dec. 16, 1971 Australia.............................. 7407/71

[52] U.S. Cl.................. 221/236, 221/251, 221/289
[51] Int. Cl............................................. B65h 5/06
[58] Field of Search .......... 221/224, 225, 251, 289, 221/290, 291, 292, 293, 294, 295, 296, 297, 298, 236; 193/35, 40

[56] References Cited
UNITED STATES PATENTS

| | | | |
|---|---|---|---|
| 1,021,876 | 4/1912 | Lister | 193/35 A |
| 1,700,697 | 1/1929 | Draper | 118/2 |
| 2,738,103 | 3/1956 | Bisese | 193/35 AX |
| 3,088,569 | 5/1963 | McClelland et al. | 221/289 |
| 3,610,372 | 10/1971 | Warren | 193/35 A X |
| 3,712,484 | 1/1973 | Wahlbeg | 214/11 |

FOREIGN PATENTS OR APPLICATIONS

| | | | |
|---|---|---|---|
| 1,148,823 | 4/1969 | Great Britain | 193/35 A |
| 1,211,991 | 3/1966 | Germany | 193/35 A |

Primary Examiner—Robert B. Reeves
Assistant Examiner—Joseph J. Rolla
Attorney, Agent, or Firm—Kirschstein, Kirschstein, Ottinger & Frank

[57] ABSTRACT

A release mechanism or gate is provided for a chute down which boxes are to be delivered in a stream, the gate having a first arm for selectively holding the first box and releasing the box when a control solenoid retracts the arm. Furthermore, a second arm is provided to move upwardly from below the first box when it is released to displace upwardly the box thereby facilitating acceleration of the first box away from the second box so that the gate can close after releasing one box. Preferably, the second arm is pivotal and has wheels for engaging the box, whilst a strip of high friction material is upwardly displaced by the second arm to engage from below and retard the second box.

5 Claims, 8 Drawing Figures

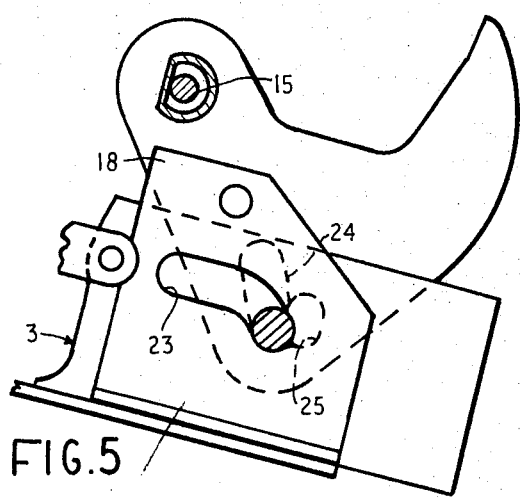
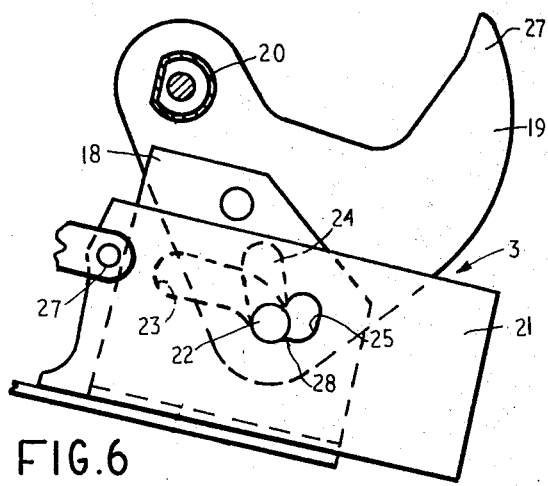

CONTROLLING THE SUPPLY OF ARTICLES

The present invention relates to controlling the supply of articles by use of a release mechanism. This invention can be especially applicable to controlling the supply of articles which are arranged on a downwardly inclined ramp, whereby the articles move downstream under the force of gravity. The release mechanism arrests motion of the articles until a desired moment in time at which operation of the release mechanism releases one or more articles for motion downstream.

In one aspect, this invention provides an article release mechanism comprising a first arm having displaceable stop means for engaging and arresting an article urged for motion in a downstream direction past the release mechanism, the stop means being displaceable to a release position in which the article is released, and a second arm having engagement means for upward displacement from below the article to displace the article in a direction having a component in the upward direction such that the article is arranged to be released from its displaced position.

This invention can be especially applicable to a system in which cardboard boxes, for example containing groceries, are to be supplied down an inclined ramp. The release mechanism can be used to hold a stream of articles on the ramp, the rear face of one article abutting the forward face of the next article in the upstream direction. Actuation of the release mechanism causes displacement of the stop means to release the leading article from the stream. However, when the release mechanism is to be used in an arrangement in which just the leading article is to be released and the subsequent articles to be retained, it can be important to obtain a spacing between the articles so that the stop means may return to its initial position. Use of the release mechanism according to this invention, can permit relative displacement between the leading article and the following article so that any tendency for the articles to adhere to one another can be overcome. It is a common practice for suppliers of goods contained in cardboard boxes to apply a small amount of glue to the outer surfaces of the boxes in order that when the boxes are arranged in a stack, adjacent boxes adhere to one another and thereby tend to stabilize the stack. However, when such boxes are to be supplied from a ramp at the bottom of which a release mechanism is located, it is important that the leading box is free to accelerate away from the following box.

Preferably, the release mechanism embodying this invention is such that the leading article is tilted relative to the following article, thereby facilitating acceleration of the leading article away from the following article.

In a preferred an important embodiment of this invention, the engagement means of the second arm comprises roller means rotatably mounted about an axis extending substantially transverse to the direction of motion of the articles.

Preferably, the second arm is pivotally mounted for motion about an axis transverse to the direction of motion of the articles. Furthermore, the first arm and the second arm are preferably connected rigidly to one another or integrally formed, the arms extending on respective sides of the axis of pivoting. This arrangement can permit an economic, simple and robust arrangement, in which as the stop means is moved towards its release position, the engagement means is simultaneously moved upwardly under the article to lift it.

The amount by which the article is lifted need only be quite small, for example the engagement means can be arranged to displace upwardly the portion of the article which it engages by an amount equal to about 1/20th of the distance of the engaged portion of the article from the stop means. For example, this amount of lifting can be about 1/16th inch.

In a preferred embodiment of this invention, the release mechanism further comprises wheel means for at least partially supporting the article when engaged by the stop means, the engagement means of the second arm being spaced further from the stop means than the wheel means. In this way, relatively little resistance to forward motion of the article occurs when the article is released, thereby facilitating acceleration of the leading article away from following articles.

Operation of the release mechanism may be by any suitable means such as a solenoid for opening the release mechanism and an extension spring for returning the release mechanism to the closed position when the article has been released. Alternatively a double acting system could be provided, such a system permitting the stop means to be forceably returned from its release position irrespective of whether a clear space behind the article being discharged has occurred. Such a double acting system could be hydraulic, pneumatic or mechanically operated, for example through a screw mechanism.

In another inventive aspect, this invention can be embodied in an article supply system comprising a downwardly inclined ramp for receiving and supplying a stream of articles, the articles being arranged to slide down the ramp under the force of gravity, and an article release mechanism embodying the inventive aspect described above located at a lower portion of the ramp for engaging and arresting the leading article of said stream and on actuation of the first arm of the release mechanism for releasing the leading article, the ramp being such that the frictural force between the articles upstream of the leading article and the surfaces of the ramp exceeds the resistance to motion of the leading article whereby the leading article, when released, accelerates away from succeeding articles to provide a gap permitting the stop means to return to its initial position for engaging articles.

In a further inventive aspect, this invention can be embodied in an apparatus for supplying articles comprising a multiplicity of supply systems in accordance with the above described inventive aspect, each ramp being arranged to store and supply a respective type of article, a conveyor arranged to receive the articles released by these supply systems, and control apparatus for selectively actuating the respective release mechanisms to release selectively desired articles.

In an important and preferred embodiment, the conveyor is driven in a synchronized manner and has movable spaced pusher members for engaging and moving a respective article along the conveyor, whereby the control apparatus is arranged to operate the desired release mechanisms at certain points in time such that the articles are fed laterally on to the conveyor at specific predetermined locations thereon, such that a plurality of articles can be supplied in a predetermined order to form a discrete set.

The above described arrangement can be especially applicable to an apparatus for making up bulk grocery orders wherein a given supply system stores and is arranged to supply a particular commodity. A desired order is supplied to a central computor which automaticly operates the release mechanisms to cause the desired boxes of groceries to be supplied in a convenient order.

An embodiment of the above described invention will now be described, by way of example, with reference to the accompanying drawings of which:

FIGS. 5 and 6 show the actuating mechanism.

Figure 1:
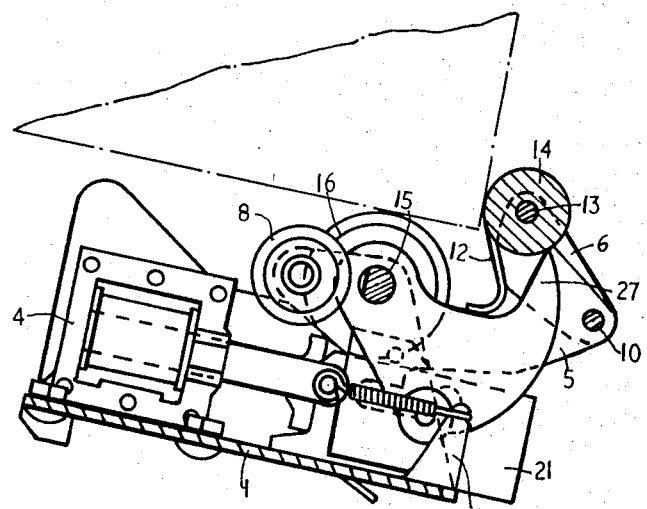
FIG. 1 is a cross sectional side elevation of an article release mechanism embodying the present invention, the section being taken along the line I—I of FIG. 2.
Figure 3:
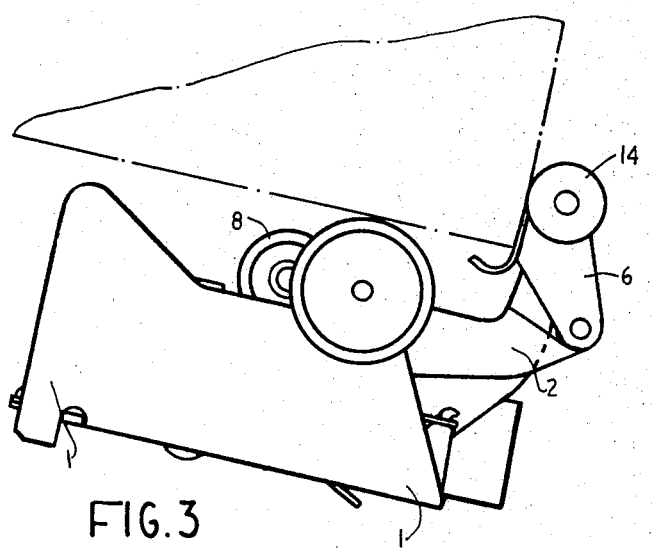
FIG. 3 is a side elevation of the release mechanism showing an article in the form of a box held in a stationary position.
Figure 4:
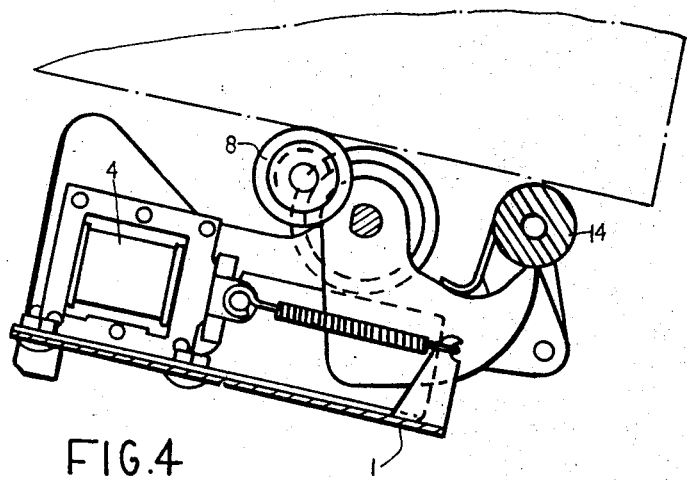
FIG. 4 is a sectional side elevation showing the release mechanism in a released position.

The illustrated release mechanism is adapted to be located near the lower end of an inclined ramp down which a stream of boxes are arranged to slide, the leading box of the stream coming to rest and being held by the release mechanism with the other boxes in end to end abutment. In this way a multiplicity of boxes can be temporarily stored on the ramp and arranged for release at any desired point in time, at which the leading box should accelerate away from the subsequent boxes down a discharge conveyor for receipt at a remote location. FIGS. 1, 3 and 4 indicate in chain dotted lines the location of a box such as a box of groceries in various positions relative to the release mechanism.

The release mechanism principally comprises a trough shaped pressed steel framework 1 which is adapted to be secured to a box supply ramp and is arranged to mount the other components of the release mechanism, an operating arm work 2 pivotally mounted to the sides of the framework 1 for rotation about an axis extending transversely of the framework and an actuating mechanism 3 arranged to displace the arm work 2 between a box holding and a box releasing position, the actuating mechanism being operated by a solenoid 4. The arm work 2 comprises a first arm 5 on which stop means in the form of a blocking member 6 is provided, and a second arm 7 having article engagement means in the form of a series of rotatable lifting wheels 8. The arm work 2 is pivotally mounted about an intermediate portion such that the first arm is longer than the second arm. The blocking member 6 comprises a pair of side arms 9 pivotally mounted on a cross-shaft 10 but biassed in an anti-clockwise direction as viewed in FIG. 1 by means of a torsion spring 11. A J-faced abutment member 12 extends between the upper ends of the side arms 9 and is mounted by being welded thereto, although the side arms 9 furthermore mount an auxiliary shaft 13 on which a series of four auxiliary rollers 14 are rotatably mounted, the portion of each roller facing upstream relative to the direction of movement of the boxes protruding through a respective recess in the upper portion of the abutment member 12.

Figure 2:
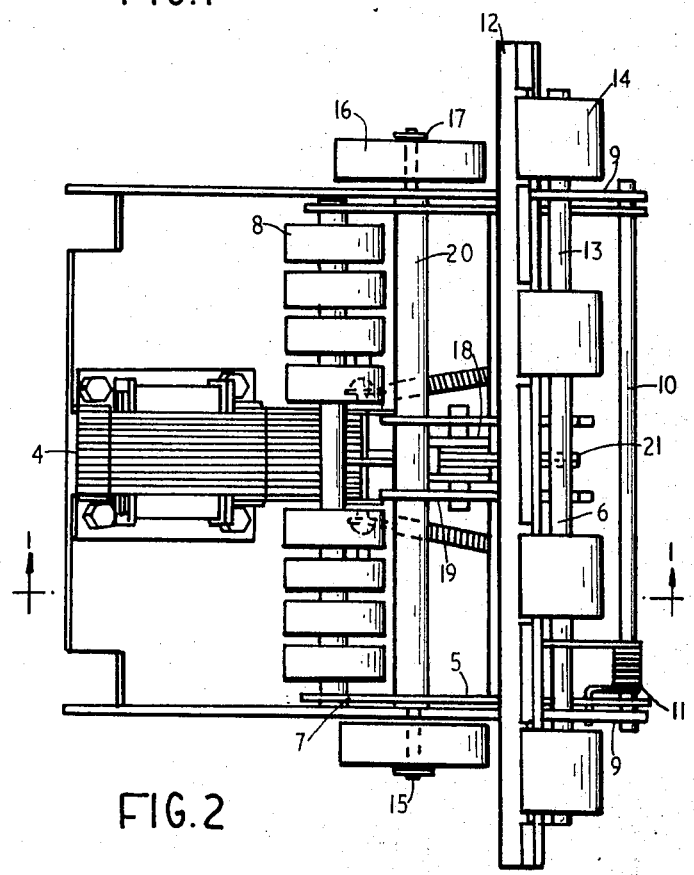
FIG. 2 is a plan view of the release mechanism of FIG. 1.

The arm work 2 is pivotally mounted on a main shaft 15 which extends laterally outwardly from each side of the framework 1, as best shown in FIG. 2, in order that an outrigger wheel 16 can be mounted at each side of the mechanism. Each wheel 16 is secured on the main shaft by means of a circlip 17.

The actuating mechanism 3 comprises a pair of upstanding mounting plates 18 which are welded to the base of the framework 1, a pair of corresponding actuating arms 19 welded to a tubular cross member 20 extending between and welded to the arm work 2, a pull bar 21 coupled to the solenoid 4 for rectilinear motion, and a coupling pin 22. As best shown in FIG. 5, each mounting plate 18 has a slot 23 terminating in a downwardly curved end portion, which is on the right hand side as shown in FIGS. 5 and 6. Each actuating arm 19 has an elongated aperture 24 having a width sufficient to accommodate the coupling pin 22, the aperture being substantially straight, whilst the pull bar 21 has a generally L-shaped aperture 25, the coupling pin 22 extending through the slots 23, the apertures 24 and the aperture 25. FIGS. 5 and 6 illustrate the actuating mechanism 3 in a rest position in which a box is to be held by the release mechanism.

In this embodiment, the actuating mechanism 3 is operated by a solenoid 4 which when energised by the application of a suitable potential causes the pull bar 3 to be moved to the left as shown in the drawings and to be held in this position until the potential is removed. In order to return the mechanism to the position shown in the drawings after operation, a pair of helical extension return springs 26 extend from a cross-pin 27 to respective upwardly extending lugs 28 which are welded to the framework 1.

The device is arranged to operate as follows:

As shown in FIG. 1 the release mechanism is mounted with its body portion below the height of an inclined ramp down which boxes are arranged to slide, the ramp being for example a ramp comprising plastic runners arranged at an angle of 17° to the horizontal. As the box slides down the ramp it rolls over the outrigger wheels 16 and abuts the confronting surfaces of the rollers 14. Under impact, the blocking member is pivotally displaced about the cross-shaft 10 against the biasing force of the spring 11. Movement of the blocking member 6 is limited when the rear surface of the abutment member 12 engages the forward surface of upwardly extending projections 27 on each of the actuating arms 19. An identical projection is also provided at the rearward extremity of each first arm 5, thereby providing four spaced surfaces against which the abutment member impinges. FIG. 3 illustrates the release mechanism when the blocking member 6 is about to reach its fully displaced position. The above described arrangement can permit cushioning of the impact of a leading box against the release mechanism, thereby avoiding damage.

When it is desired to release the box, electric potential is applied to the solenoid 4 thereby retracting the pull bar 21 and, as best shown in FIG. 6 causing the coupling pin 21 to be bodily displaced upwardly over a small ridge 28 which extends upwardly into the L-shaped aperture 25; the coupling pin is then free to move upwardly through the aperture 25 during further movement. The initial motion wherein the pin 22 moves over the ridge 28 is an unlatching movement, whereby the release mechanism is free to release the box. During subsequent motion of the pull bar 21, the coupling pin rides up the curved end portion of slot 23 in the mounting plates 18 and simultaneously rides up the upwardly directed straight elongated aperture 24 in the actuating arms 19, thereby causing pivotal motion of the actuating arms and thus the whole arm work 2 in a clockwise direction as shown in the drawings. In this way the release mechanism attains the position shown in FIG. 4. It will be noted that during this motion the rollers 14 of the blocking member are disposed to roll over the leading face of the box and under the bottom of the box in which position the blocking member is free to move back to its original position under the force of the spring 11.

As shown in FIG. 4, this releasing motion of the mechanism actuated by the solenoid 4 causes the second arm 7 to be moved pivotally upwardly so that the lifting wheels 8 engage the bottom of the box and displace it upwardly thereby placing it in rolling support so as to facilitate acceleration of the box away from a succeeding box in a stream of boxes mounted on the ramp. Furthermore, the motion of the arm work causes the box to be tilted slightly relative to the succeeding box thereby overcoming any surface adhesion between adjacent boxes.

Figure 7:
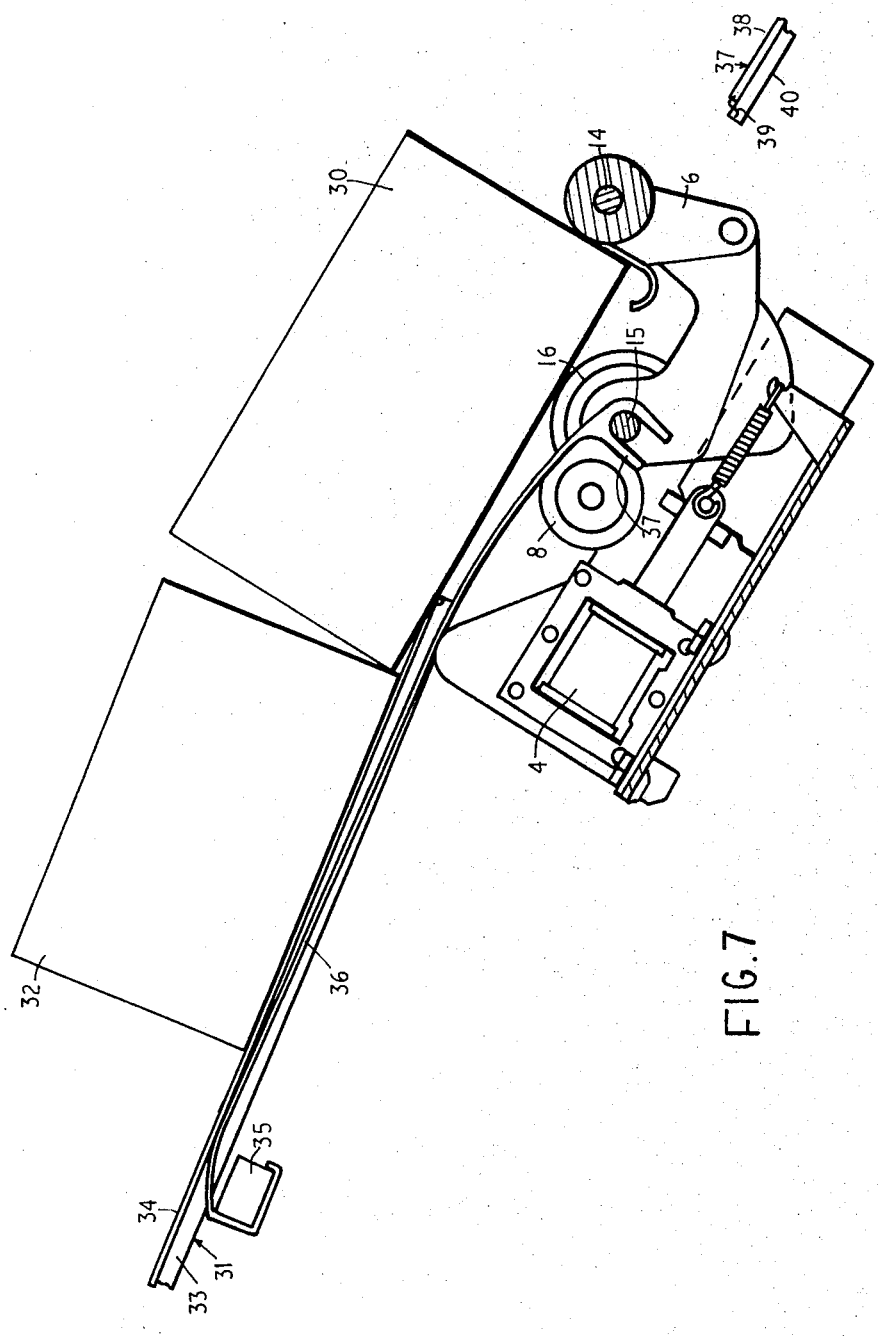
FIGS. 7 and 8 show a modification of the system.
Figure 8:
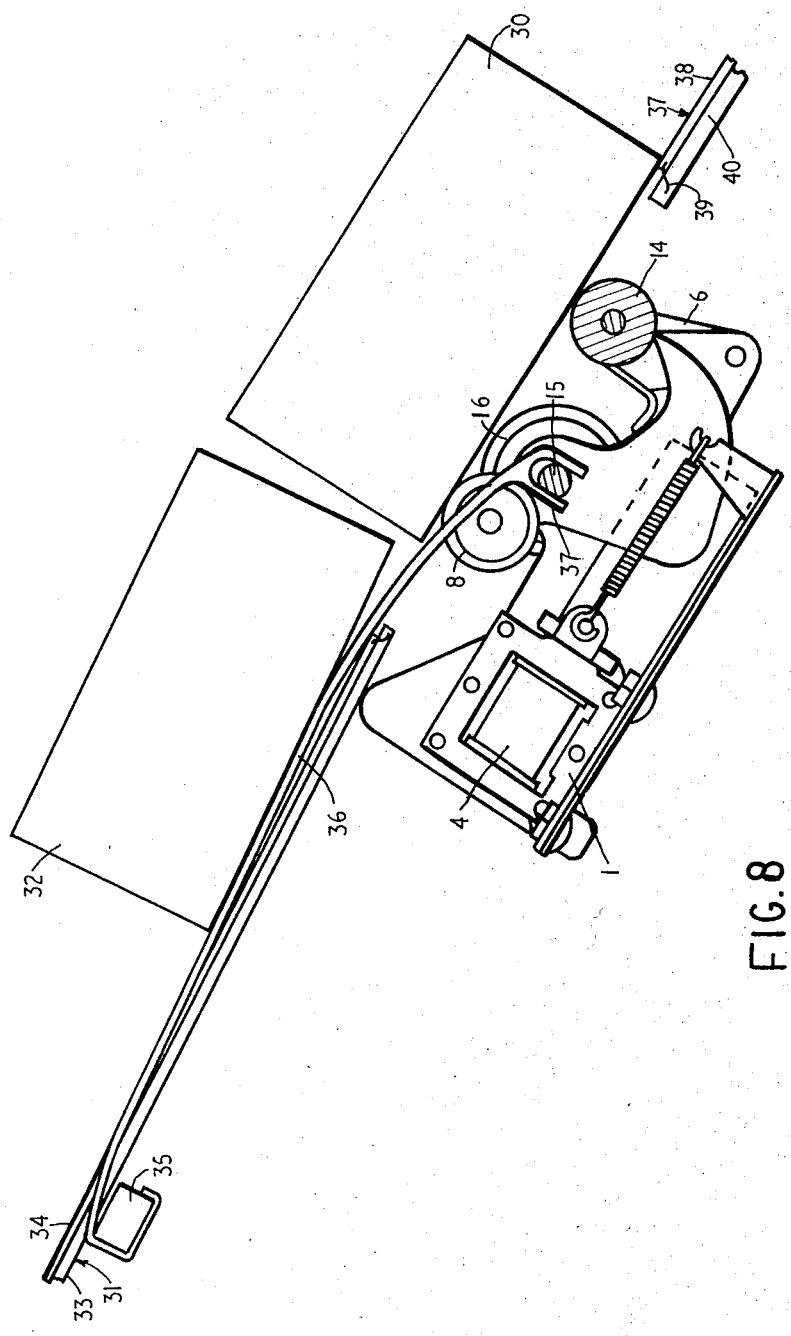

By use of the above described release mechanism, reliable acceleration of a leading box can be established, whereby when the leading box has accelerated past the mechanism, the mechanism can return to its original position under influence of the return springs 26, the second arm moving upwardly into the gap between the spaced boxes so as to arrest the subsequent box. Referring to FIGS. 7 and 8, a modification is shown in which the release mechanism is associated with an inclined ramp system down which boxes are to be supplied, the modification consisting of a relatively high friction braking strip which is operable to retard motion of boxes upstream of the release mechanism.

FIG. 7 shows the release mechanism in a closed position with a first box 30 abutting the auxiliary rollers 14 and resting on the outrigger wheels 16 and the downstream end portion of an inclined ramp 31. A second box 32 is supported by the ramp 31 and rests against the rear of the first box 30. The ramp 31 comprises an extruded metal support member 33 having a channel shaped upper portion in which a tubular plastic support element 34 is partially inserted; the member 34 comprises tubular sections of plastic material threaded on a wire which is secured to the member 33. As shown in the drawing, the plastic member 34 projects above the member 33 to provide a support surface for the boxes. The ramp in fact comprises a plurality of parallel plastic support members 34 and by selecting the type of plastic relative to the box material and the angle of inclination of the ramp, the acceleration of a box down the ramp can be controlled.

As illustrated, the ramp 31 is mounted on a tubular cross beam 35 and it is to this cross beam 35 that one end of a braking strip 36 is mounted. The braking strip 36 comprises a strip-like metal member attached at one end to the cross beam 35 and extending along the line of the ramp to a forked opposite end 37 which engages over the main shaft 15 of the release mechanism. It will be noted that adjacent each end the braking strip is curved whereas its central portion is substantially straight. To the upper surface of the braking strip 36, a coating or a member of relatively high friction is provided, for example a strip of polypropylene. When the release mechanism is closed, the strip 36 and its high friction surface is below the boxes and makes no engagement. However, when a release mechanism is opened, as shown in FIG. 8, the lifting wheels engage the first box 30 from below and lift it, the wheels 8 engaging the box at a portion remote from its leading face. In this way, the box 30 is tilted to a slightly greater angle of inclination to the horizontal and the box readily rolls forwardly down onto a take-off ramp 37 extending downstream to a receiving station. The take-off ramp 37 comprises a plastic support rod 38 of tubular form mounted on a mounting wire 39 whereby the plastic rod is secured onto a metal mounting rail 40. A plurality of such plastic rods is provided.

As the lifting wheels 8 are raised to engage the box 30, the shaft on which the lifting wheels are mounted engages in its central portion a downstream curved end portion of the braking strip 36. The strip 36 is thus raised to the position shown in FIG. 8 whereby the straight central portion is disposed slightly above the plastic support members 34 supporting the second box 32, thereby slightly lifting the box 32 and by virtue of the relatively high frictional engagement reducing acceleration of the box 32. In this way a gap readily occurs between boxes 30 and 32 even if the boxes have an inherent tendency to adhere to one another, for example due to glue existing on the surface of the boxes. Additionally, the boxes are angled relative to one another in order to assist box separation. Box separation is important in order that the release mechanism can close under the influence of the relatively light return springs which only operate when the first box 30 has passed over the rollers 14.

It will be appreciated that the degree by which the front box is tilted by the wheels 8 can be selected to suit the particular Application.

I claim:

1. A release mechanism for controlling the supply of flat-bottomed articles slidable down a downwardly inclined ramp under the force of gravity, said mechanism comprising:

A. a body member,
B. a first arm
  i. having stop means for holding an article in an article retaining zone on the ramp against motion in a downstream direction,
C. a second arm rigidly fixed relative to the first arm and
  i. having engagement means for engaging below the article,
D. said first and second arms being pivotably mounted on said body member for motion, when considered in plan view, about an axis extending transverse of said retaining zone between respective
  i. first positions wherein the article is adapted to be retained by engagement with said stop means and
  ii. second positions wherein the stop means is lower and the engagement means is higher for lifting and supporting at least a portion of the article whereby the article is tilted to a steeper angle,
E. both said arms having respective surfaces, including the surfaces of freely rotatable reel means, for supporting the article with low resistance to motion when the arms are in said second positions so that the foremost article will accelerate down the ramp more rapidly than the subsequent article, thus obtaining a spacing between the foremost article and the subsequent article, F. said arms extending on opposite sides of said axis with said engagement means disposed upstream of and closer to said axis than said stop means, G. trigger means normally holding said arms in said first positions, H. operating means for selectively releasing the trigger means, I. said arms being pivotable to said second position under the load of an article to be released when said trigger means is released, and J. return means for moving said arms from said second to said first positions when the article has been released and for causing said trigger means to lock and retain the arms in said first positions.

2. A release mechanism according to claim 1 and further comprising wheel means for at least partially supporting the article in the article retaining zone when engaged by said stop means, said engagement means being disposed further from said stop means than the wheel means when the engagement means is displaced to engage the article.

3. An article supply system comprising a downwardly inclined ramp having a support surface for supporting and engaging frictionally a stream of flat bottomed articles which are arranged to slide down the surface under the force of gravity, and a release mechanism according to claim 1 located at a downstream end of the ramp and co-operating therewith, the release mechanism supporting the article when the arms are in said second position with less resistance to motion than the resistance to motion provided by frictional forces between an article and the support surface which tend to oppose sliding motion of articles down the ramp, the supply system further comprising actuation means for actuating said operating means to selectively release a leading article from a stream of articles disposed on the ramp and to close subsequently whereby a single article can be released.

4. An article supply system comprising a downwardly inclined ramp having a support surface for supporting and engaging frictionally a stream of articles which are arranged to slide down the surface under the force of gravity, and an article release mechanism located at a downstream end of the ramp and cooperating therewith, the article release mechanism comprising a body member, a first arm having stop means for holding an article in an article retaining zone against motion in a downstream direction, a second arm rigidly fixed relative to the first arm and having engagement means for engaging below the article, said first and second arms being pivotably mounted on said body member for motion, when considered in plan view, about an axis extending transverse of said retaining zone between respective first positions wherein the article is adapted to be retained by engagement with said stop means and second positions wherein the stop means is lower, said arms having respective surfaces including the surfaces of freely rotatable wheel means for supporting the article with relatively low resistance to motion when the arms are in said second positions, said arms extending on opposite sides of said axis with said engagement means disposed upstream of and closer to said axis than said stop means, trigger means normally holding said arms in said first positions, operating means for selectively releasing the trigger means, said arms being pivotable to said second position under the load of an article to be released when said trigger means is released and return means for moving said arms from said second to said first positions when the article has been released and for causing said trigger means to lock and retain the arms in said first positions, said support surface of the ramp having a relatively high frictional characteristic when supporting an article compared with the relatively low resistance to motion of the article when supported by said arms in said second positions, and further comprising friction brake means operatively connected to the release mechanism and displaceable by said operating means between a retracted position when said first and second arms are in said first positions and a displaced position when said first and second arms are in said second positions, the friction brake means being mounted so that an article upstream of the article to be released from the article retaining zone is engaged and tends to be retarded by engagement with the friction brake means whereby acceleration of said released article from the following article is facilitated.

5. An article supply system as claimed in claim 4, wherein said friction brake means comprises a strip member pivotally connected at one end thereof to the ramp at a portion below the upper article supporting surfaces thereof, and being connected at its downstream end to the release mechanism.

* * * * *